Aug. 3, 1937.                F. H. C. MACDONALD                2,089,031
                                 FISHING REEL
                             Filed July 26, 1935             2 Sheets-Sheet 1
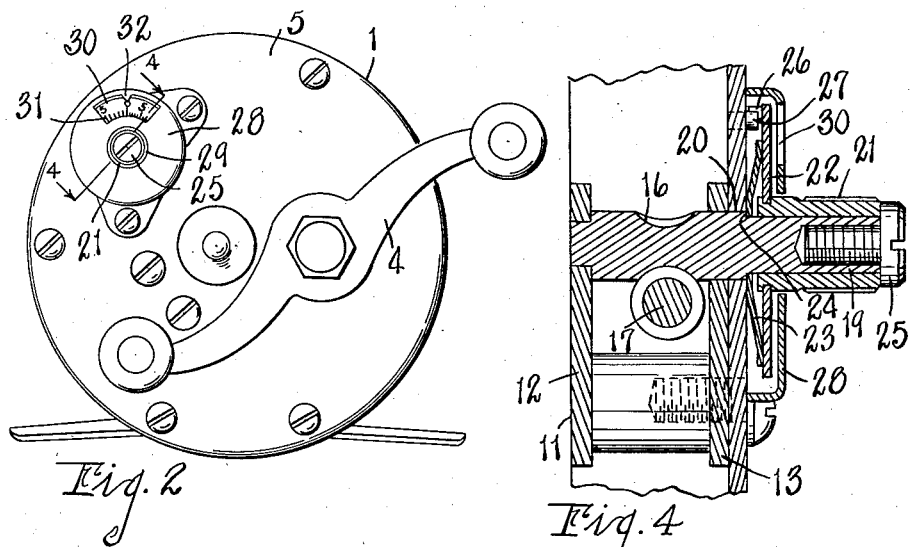
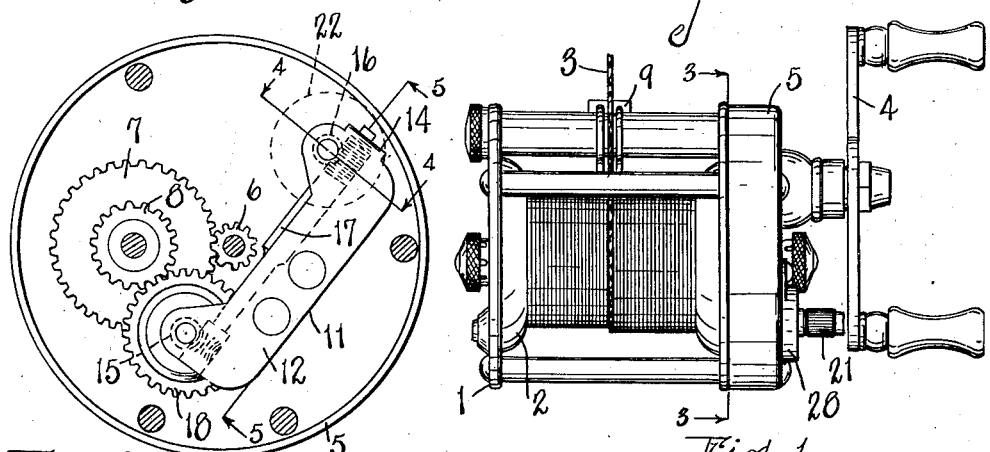
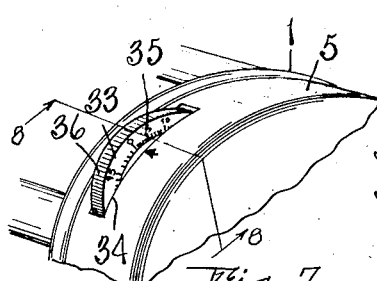
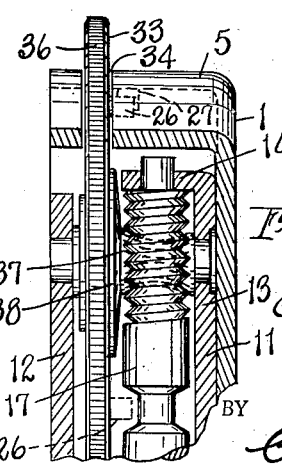
INVENTOR.
Francis H. C. Macdonald
BY
Chappell Earl
ATTORNEYS

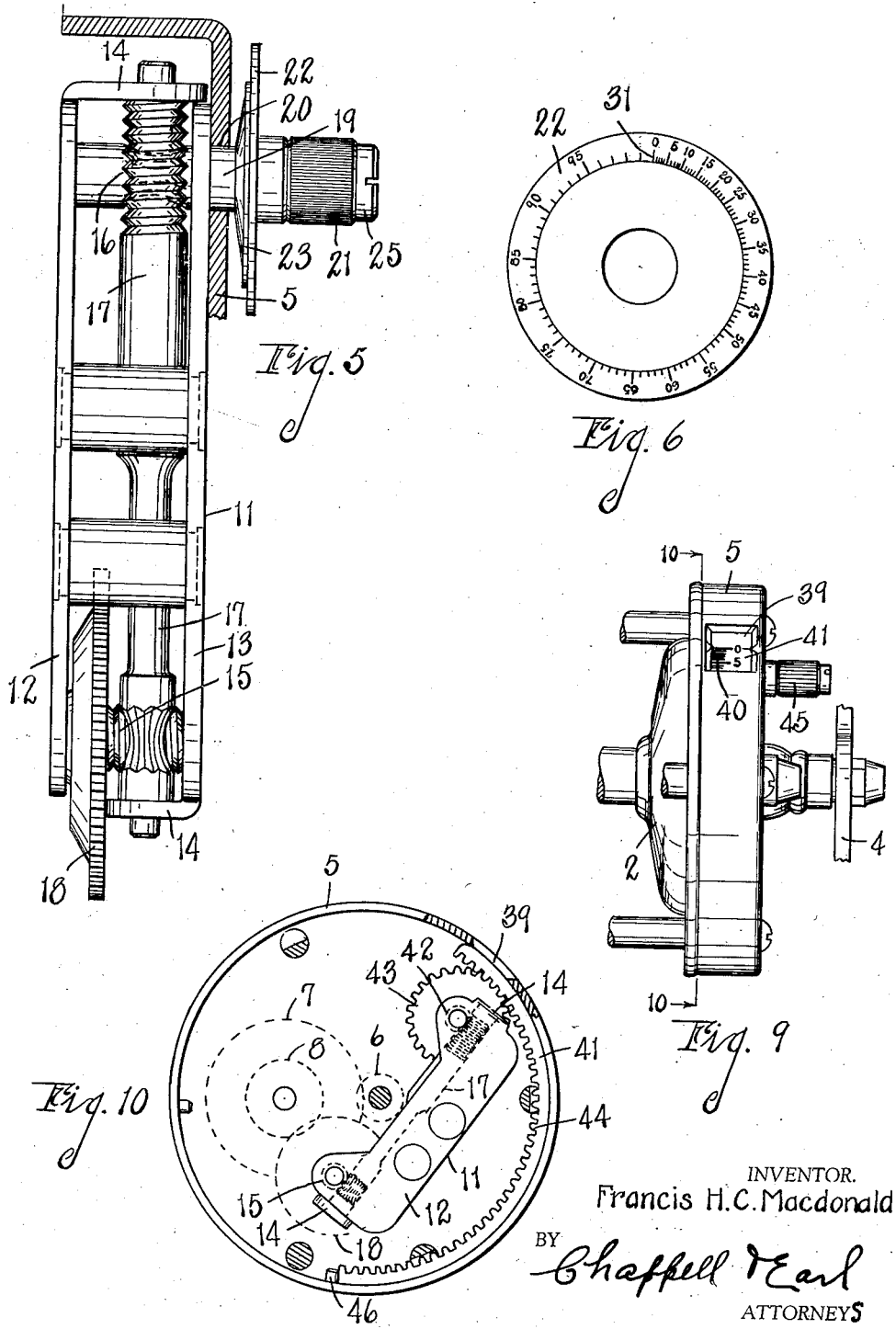

Patented Aug. 3, 1937

2,089,031

UNITED STATES PATENT OFFICE 2,089,031

FISHING REEL

Francis H. C. Macdonald, Perth Road, Ontario, Canada, assignor to Shakespeare Company, Kalamazoo, Mich.

Application July 26, 1935, Serial No. 33,200

17 Claims. (Cl. 33—139)

The main objects of this invention are:

First, to provide a fishing reel having an odometer associated therewith for indicating the length of the line unwound from the reel in casting.

Second, to provide a casting odometer which is simple and economical in its parts and which may be combined with or readily embodied in fishing reels of standard construction now on the market.

Third, to provide an improved method of and means for indicating the length of line cast from a fishing reel.

Objects relating to details and economies of my invention will appear from the description to follow. The invention is defined and pointed out in the claims.

Preferred embodiments of my invention are illustrated in the accompanying drawings, in which:

Fig. 1 is a top view of a fishing reel embodying features of my invention.

Fig. 2 is an enlarged view in end elevation of the reel.

Fig. 3 is an enlarged fragmentary transverse section taken on a line corresponding to line 3—3 of Fig. 1.

Fig. 4 is an enlarged fragmentary sectional view taken on a line corresponding to line 4—4 of Figs. 2 and 3.

Fig. 5 is an enlarged fragmentary view of the odometer.

Fig. 6 is a view in front elevation of the indicating dial.

Fig. 7 is a fragmentary perspective view of a modification.

Fig. 8 is an enlarged fragmentary sectional view of the modification of Fig. 7.

Fig. 9 is a fragmentary view in front elevation of another modification.

Fig. 10 is a fragmentary transverse sectional view taken on line 10—10 of Fig. 9.

Referring to the embodiment of my invention illustrated by Figs. 1 to 6, inclusive, 1 in general is a fishing reel having a spool 2 on which is wound the line 3. The crank 4 of the reel is rotatably mounted on the chambered head 5 and is connected by means of the gear 7 to the spool pinion 6. The crank shaft is also provided with a gear 8 which meshes with gear 18. The line guide carriage 9 is reciprocated through a suitable traversing shaft having driving connections to the crank shaft, the driving connections not being illustrated.

In order to indicate the length of each cast, I provide a casting odometer or measuring device designated generally by the numeral 11 which, in the embodiment illustrated in Figs. 1 to 6, comprises brackets 12 and 13 of L-cross section having inturned ends 14. Between the brackets and adjacent each end thereof, I mount worm 15 and worm pinion 16 which are connected by the worm and pinion shaft 17 disposed between the brackets and supported for rotation in the inturned ends 14 thereof. The shaft 19 of the worm pinion 16 is extended through a wall opening 20 in the chambered head 5.

A cast indicating dial 22 provided with an adjusting knob 21 is mounted on this projecting end of the shaft 19 and the shaft is provided with a dished spring friction disk 23 bearing against the dial and providing a friction driving connection therefor to the shaft which permits manual adjustment of the indicia dial for returning it to zero position should it not automatically return to zero position on the winding in of the line. The disk is supported on the shaft against its shoulder 24. The screw 25 tapped into the end of the shaft retains the parts in assembled relation and provides an outward thrust receiving member.

Coacting stops 26 and 27 are provided on the head of the dial for resetting the latter to initial position. It will be understood that the dial should be at the zero position at the beginning of the cast and that sometimes owing to wetting and stretching of the line or the tension on the line in winding, successive windings might not be exactly the same; that is, on winding up the line, the dial might not be completely returned to zero.

On the head 5, I mount a casing 28 for the dial 22, the casing being provided with an opening 29 for the knob 21 and a window 30 for the dial. The dial is calibrated in units of length, preferably yards, of the line unwound from the spool in casting. The scale 31 so calibrated is exposed by the window 30 so that it may be readily read in connection with a pointer 32 on the casing 28. As the line is withdrawn from the spool, the diameter of the convolutions diminishes and the scale is calibrated as shown by Fig. 6 to compensate or care for this variation. It should be noted here that the showing of the scale in Fig. 6 is conventional, no attempt having been made to make the calibrations accurate.

After the cast, the scale reading in connection with the pointer 32 indicates the approximate distance of the cast. While the scale indicates the length of line withdrawn from the spool instead of the distance of the cast, it will be understood that the distance of the cast is approximately equal to the length of line unwound from the spool.

If desired, as shown by Figs. 7 and 8, the indicating dial 33 may project through a peripheral opening 34 in the head 5 to expose the scale 35 thereon, the periphery of the dial in this case being knurled at 36 to facilitate the manual resetting thereof on the pinion 37. In the modification, the dial is frictionally held in adjusted position on the pinion 37 by means including the dished spring disk 38. Otherwise, the modification of Figs. 7 and 8 is substantially the same as that shown and described in connection with the foregoing embodiment.

Referring to Figs. 9 and 10, I show the head 5 provided with a peripheral dial window 39 exposing the scale 40 on the periphery of an indicating dial 41 rotatably mounted within the periphery of the head. In this embodiment, the pinion 42 is provided with a gear 43 meshing with an internal gear 44 on the indicating dial 41. The adjusting knob 45 is connected to the gear 43, the gear and knob being frictionally mounted on the pinion 42 for adjusting the dial relative to the pinion. For example, before casting, the knob 45 is manipulated so that the dial 41 is moved into engagement with the stop 46. This constitutes the initial position of the dial. Otherwise, the modification of Figs. 9 and 10 is the same as that described in connection with Figs. 1 to 6, inclusive.

It will be appreciated by those skilled in the art that I provide novel means for indicating the length of line unwound from the reel in casting. My odometer may be readily associated with or embodied in commercial fishing reels of standard construction with only a few minor changes thereto. Further, my fishing reel odometer is simple and economical in its parts and very efficient and effective for the purpose intended.

I have illustrated and described my improvements in embodiments which I have found very practical. I have not attempted to illustrate or describe other embodiments or adaptations as it is believed this disclosure will enable those skilled in the art to embody or adapt my improvements as may be desired.

Although I have shown and described certain specific embodiments of my invention, I am fully aware that many modifications thereof are possible. My invention is therefore not to be restricted except insofar as is necessitated by the prior art and by the spirit of the appended claims.

Having thus described my invention, what I claim as new and desire to secure by Letters Patent, is:

1. In a fishing reel, the combination of a frame including a chambered head, a spool, a crank, gear driving connections for said crank to said spool housed within said head, a casting odometer comprising a bracket disposed within said head, worm gear pinions mounted on said bracket, one of said worm gear pinions being provided with a gear coacting with one of said spool driving gears and the other being provided with a shaft projecting from said head, a shaft mounted on said bracket and provided with worms coacting with said worm pinions, as indicating dial calibrated in units of length of the line unwound from the reel and provided with an adjusting knob rotatably mounted on the projecting end of said worm pinion shaft, a spring friction driving disk on said pinion shaft coacting with said dial, and a casing for said dial mounted on said head and having an opening for said knob and a window for said dial.

2. In a fishing reel, the combination of a frame including a chambered head, a spool, a crank, gear driving connections for said crank to said spool housed within said head, a casting odometer comprising a bracket disposed within said head, worm gear pinions mounted on said bracket, one of said worm gear pinions being provided with a gear coacting with one of said spool driving gears and the other being provided with a shaft projecting from said head, a shaft mounted on said bracket and provided with worms coacting with said worm pinions, and an indicating dial calibrated in units of length of the line unwound from the reel mounted on said worm pinion shaft.

3. In a fishing reel, the combination with a frame, a spool, and driving gear therefor, of a casting odometer comprising worm gear pinions, one of said worm gear pinions being provided with a gear coacting with said spool driving gear and the other being provided with a dial shaft, a shaft provided with worms coacting with said worm pinions, a cast indicating dial rotatably mounted on said worm pinion shaft and provided with an adjusting knob, and a friction driving connection for said dial to said pinion shaft, comprising friction means mounted on and driven by said pinion shaft, said means normally engaging said dial.

4. In a fishing reel, the combination with a frame, a spool, and driving gear therefor, of a casting odometer comprising worm gear pinions, one of said worm gear pinions being provided with a gear coacting with said spool driving gear and the other being provided with a dial shaft, a shaft provided with worms coacting with said worm pinions, and a cast indicating dial and friction means mounted on said worm pinion shaft, said means normally bearing against the dial to drive the same.

5. In a fishing reel, the combination with a frame and spool, of a casting odometer comprising an indicating dial calibrated in units of length of the line, a reducing gear driving connection for said spool to said dial comprising a pair of worm gears, one of which has driving connection with said spool and the other of which is provided with a shaft on which said indicating dial is rotatably mounted, there being a frictional driving connection between said shaft and dial, comprising friction means mounted on and driven by said shaft, said means normally engaging said dial, and manually operated means for adjusting said dial on said shaft.

6. In a fishing reel, the combination with a frame and spool, of a casting odometer comprising an indicating dial calibrated in units of length of the line, a reducing driving connection from said spool to said dial, comprising a friction disk concentric with and in driving engagement with said dial, means for driving said disk from said spool, and manually operated means for adjusting said dial relative to said disk.

7. In a fishing reel, the combination with a frame and spool, of a casting odometer comprising an indicating dial calibrated in units of length of the line, a reducing gear driving connection for said spool to said dial comprising a pair of worms and a pair of worm gears meshing with said worms, one of said gears having driving connection with said spool and the other being provided with a shaft on which said indicating dial is mounted, and means on said shaft for frictionally transmitting motion from said shaft to said dial.

8. In a fishing reel, the combination with a frame and a spool, of a casting odometer comprising an indicating member calibrated to indicate the length of the line unwound from the spool, and reducing gear driving connections for said spool to said indicating element including a friction disk arranged concentric to and in driving relation to said dial, said friction means permitting the adjustment of said dial.

9. In a fishing reel, the combination with a frame including a chambered head, of a spool driving pinion within said head, a casting odometer comprising a calibrated line pay-out indicating element, and reducing driving connections from said spool pinion to said indicating element including a slip friction disk permitting the manual adjustment of said indicating element independently of the rotation of the spool, said disk operatively engaging said indicating element and being driven from said spool.

10. In a fishing reel, the combination with a frame including a chambered head, of a spool driving pinion within said head, a casting odometer comprising a calibrated line pay-out indicating element, and driving connections from said spool pinion to said indicating element comprising a resilient rotating member actuating said indicating element, and means for driving said member from said spool pinion.

11. In a fishing reel, the combination with a frame having a chambered head and a spool, of a spool gear, a casting odometer mounted within said head and comprising a two-sided bracket in the form of a channel, a worm and a worm pinion mounted between the sides of said bracket, a shaft disposed within the channel of the bracket and connecting said worm and worm pinion, means connecting said worm to said spool gear, and an indicating dial having a friction driving connection with said worm pinion whereby it may be adjusted without rotating said pinion.

12. In a fishing reel, the combination with a frame having a chambered head and a spool, of a spool gear, a casting odometer mounted within said head and comprising a two-sided bracket in the form of a channel, a worm and a worm gear pinion mounted between the sides of said bracket, a shaft disposed within the channel of the bracket and connecting said worm and worm pinion, means connecting said worm to said spool gear, and an indicating dial having a driving connection with said worm pinion.

13. In a fishing reel, the combination with a spool, of a casting odometer comprising indicating means, driving means connecting said indicating means to said spool comprising a rotating friction disk actuating said indicating means, and means for driving said disk from said spool, and means for adjusting said indicating means relative to said disk.

14. An odometer for fishing reels, comprising a bracket adapted to be mounted in the head of the reel and carrying a driving gear adapted to mesh with a driven pinion of the reel, a worm pinion connected to said driving gear, a worm shaft driven by said worm pinion, a dial shaft driven by said worm shaft, an indicating dial adjustably mounted on said dial shaft and having friction driving connections therewith, and manually operable means for adjusting said dial, the head having an opening for said dial, the latter being calibrated in units of length for showing the length of the line cast from said reel.

15. In a fishing reel, the combination with a spool, of a head having a casting odometer mounted on said head and comprising a two-sided bracket in the form of a channel, pinions mounted between the sides of said bracket, a worm shaft disposed in said bracket and connecting said cross pinions, gear means connecting one of said cross pinions to said spool, an indicating dial having an adjusting knob rotatably mounted on the other pinions, a friction drive means disposed between the pinion and said dial, and a casing for said dial mounted on said head and having an opening for said knob and a window for said dial, the latter being calibrated in units of length of the line unwound from the reel in casting.

16. In a fishing reel, the combination with a spool, of a head having a casting odometer mounted on said head and comprising a two-sided bracket in the form of a channel, pinions mounted between the sides of said bracket, a worm shaft disposed in said bracket and connecting said cross pinions, gear means connecting one of said cross pinions to said spool, an indicating dial having an adjusting knob rotatably mounted on the other pinion, a friction drive means disposed between the pinion and said dial, and a casing for said dial having an opening for said knob and a window for said dial.

17. In a fishing reel, the combination with a head having a peripheral wall opening and containing a drive gear connected to the spool of the reel, of a casting odometer mounted within said head and comprising a two-sided bracket in the form of a channel, cross pinions mounted between the sides of said bracket, a worm shaft disposed in said bracket and connecting said cross pinions, gear means connecting one of said cross pinions to said drive gear, an indicating dial rotatably mounted on the other pinion and having a portion exposed by the peripheral wall opening in said head, means disposed between said dial and the pinion for holding the dial thereon in adjusted position, and a scale on the exposed part of said dial calibrated in units of length of the line unwound from the spool in casting.

FRANCIS H. C. MACDONALD.